(12) United States Patent
Kobayashi

(10) Patent No.: US 7,578,287 B2
(45) Date of Patent: Aug. 25, 2009

(54) FUEL FILTER FOR AUTOMOBILE

(75) Inventor: Akira Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 11/724,316

(22) Filed: Mar. 15, 2007

(65) Prior Publication Data

US 2007/0246027 A1 Oct. 25, 2007

(30) Foreign Application Priority Data

Apr. 25, 2006 (JP) ............................. 2006-120554

(51) Int. Cl.
*F02M 31/02* (2006.01)
(52) U.S. Cl. ................. 123/557; 210/435; 210/454; 210/86
(58) Field of Classification Search .............. 123/543, 123/557, 558, 468, 469, 554, 555; 210/86, 210/435, 454, 249, 453
See application file for complete search history.

(56) References Cited

U.S. PATENT DOCUMENTS 5,958,237 A * 9/1999 Cort et al. ................. 210/416.4
6,939,464 B1 * 9/2005 Jiang et al. ................. 210/232

FOREIGN PATENT DOCUMENTS

JP 61-160558 A 7/1986

* cited by examiner

*Primary Examiner*—Michael Cuff
*Assistant Examiner*—Hung Q Nguyen
(74) *Attorney, Agent, or Firm*—Arent Fox LLP

(57) ABSTRACT

In a fuel filter for an automobile, a filter element for filtering fuel is accommodated in a tubular filter case having a bottom surface and a side surface. A fuel heater is mounted on the side surface of the filter case. Therefore, the filter case and the filter element can be heated directly from heat generated by the fuel heater to effectively heat the fuel flowing therethrough, thereby preventing precipitation of a wax component that could clog the filter element. Also, fuel supply passages for supplying the fuel to the filter element are formed along the side surface of the filter case. Therefore, the fuel is brought into sufficient contact with the filter case heated by the fuel heater, thereby effectively heating the fuel.

3 Claims, 5 Drawing Sheets

FUEL FILTER FOR AUTOMOBILE

CROSS-REFERENCE TO RELATED APPLICATION

The present invention claims priority under 35 USC 119 based on Japanese Patent Application No. 2006-120554, which is incorporated by reference herein in its entirety.

BACKGROUND OF THE INVENTION

1. Field of the Invention

The present invention relates to a fuel filter for an automobile, the fuel filter having a filter element for filtering fuel and a fuel heater for heating the fuel.

2. Description of the Related Art

Japanese Patent Application Laid-open No. 61-160558 discloses a device having an electric heater provided in a fuel filter disposed in a fuel supply passage for supplying fuel (light oil) from a fuel tank to a diesel engine. The electric heater heats the fuel at a low temperature to prevent a filter element from clogging due to precipitation of a wax component contained in the fuel. The fuel filter includes a cylindrical heat-exchange chamber 22 accommodating therein the filter element 14 and a heating chamber 24, which is connected to a lower end of the heat-exchange chamber 22 and which accommodates the electric heater 16 therein. In the disclosed conventional device, the fuel is heated to a temperature wherein the wax component does not precipitate while passing through the heating chamber 24 and the heat-exchange chamber 22, thereby preventing the filter element 14 accommodated in the heat-exchange chamber 22 from clogging.

However, in the disclosed conventional device, the heating chamber 24 accommodating the electric heater 16 is connected to the lower end of the cylindrical heat-exchange chamber 22. Therefore, it is difficult for the heat generated by the electric heater 16 to be efficiently transferred to a wall surface of the heat-exchange chamber 22, leading to a possibility that the fuel is not sufficiently heated unless the capacity of the electric heater 16 is increased.

SUMMARY OF THE INVENTION

Accordingly, it is an aspect of the present invention to prevent a filter element from clogging due to precipitation of a wax component by efficiently heating fuel, while reducing the overall size of a fuel filter.

In order to at least achieve the above-described aspect, according to a first feature of the present invention, there is provided a fuel filter for an automobile, including a filter element for filtering fuel; a tubular-shaped filter case having a bottom surface and a side surface accommodating the filter element therein; and a fuel heater mounted on the side surface of the filter case.

With the above-described structural arrangement of the first feature, the filter element for filtering the fuel is accommodated in the tubular filter case having the bottom surface and the side surface. The fuel heater is mounted on the side surface of the filter case. Therefore, the filter case and the filter element are directly heated using the heat generated by the fuel heater to effectively heat the fuel flowing therethrough, thereby preventing the precipitation of a wax component. As a result, a relatively small sized fuel heater is used, thereby reducing the overall size of the fuel filter.

According to a second feature of the present invention, in addition to the first feature, a fuel supply passage for supplying the fuel to the filter element is formed along the side surface of the filter case.

With the above-described structural arrangement of the second feature, the fuel supply passage for supplying the fuel to the filter element is formed along the side surface of the filter case. Therefore, it is possible to bring the fuel into sufficient contact with the filter case heated by the fuel heater to effectively heat the fuel. Moreover, a sudden increase in the fuel flow path resistance and a sudden change in the fuel flow rate in the fuel supply passage are both prevented, thereby enabling a relatively smooth supply of fuel.

According to a third feature of the present invention, in addition to the first or second feature, a fuel supply passage for supplying the fuel to the filter element is formed along or around the heater.

With the above-described structural arrangement of the third feature, the fuel supply passage for supplying the fuel to the filter element is formed along the fuel heater. Therefore, it is possible to bring the fuel into sufficient contact with the fuel heater to effectively heat the fuel.

According to a fourth feature of the present invention, in addition to any of the first-to-third features, the filter case includes a plurality of boss portions attached to an external member, wherein the heater is disposed between the boss portions.

With the fourth feature, the filter case is mounted to the external member via the plurality of boss portions provided on the filter case, and the fuel heater is disposed using an empty space between the boss portions of the filter case, thereby reducing the overall size of the fuel filter.

First and second fuel supply passages in an embodiment described below correspond to the fuel supply passage of the present invention. Also, a mounting bracket in the embodiment described below corresponds to the external member of the present invention.

The above and other aspects, features and advantages of the invention will become apparent from the following description of a preferred embodiment taken in conjunction with the accompanying drawings.

DETAILED DESCRIPTION OF THE PREFERRED EMBODIMENT

Figure 1:
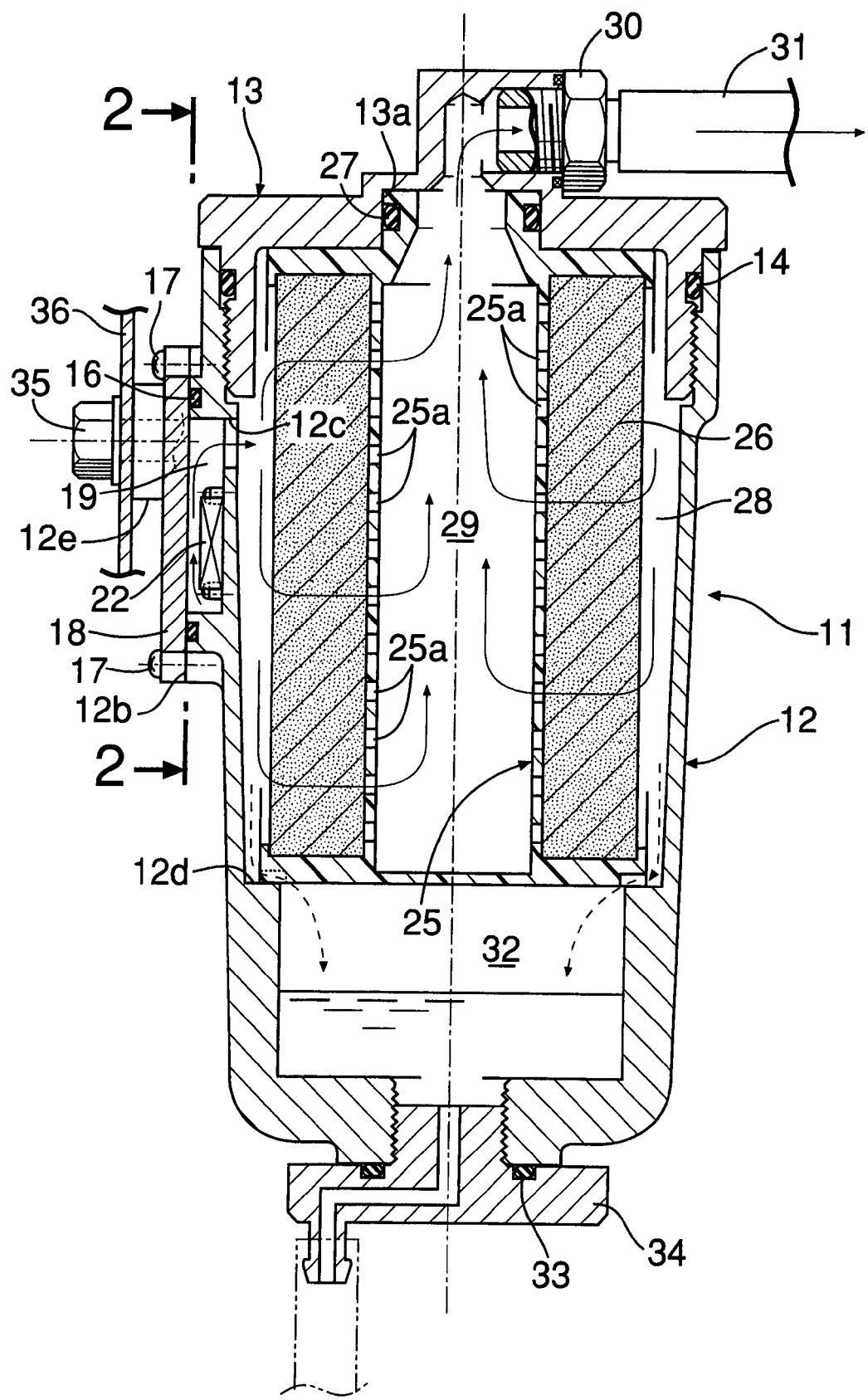
FIG. 1 is a vertical cross-sectional view of a fuel filter for an automobile according to a preferred embodiment of the present invention.
Figure 2:
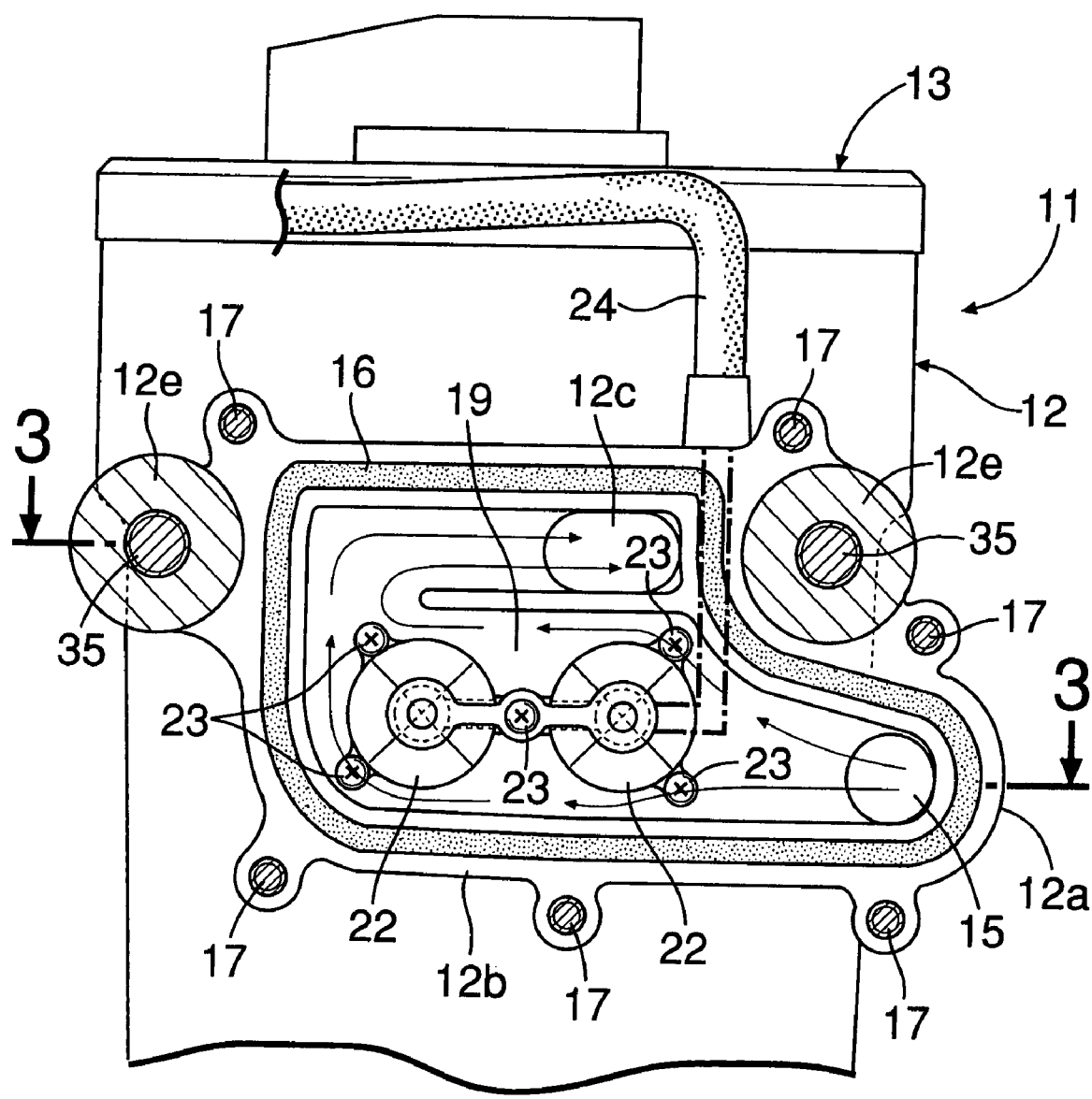
FIG. 2 is a view taken along a line 2-2 in FIG. 1.
Figure 3:
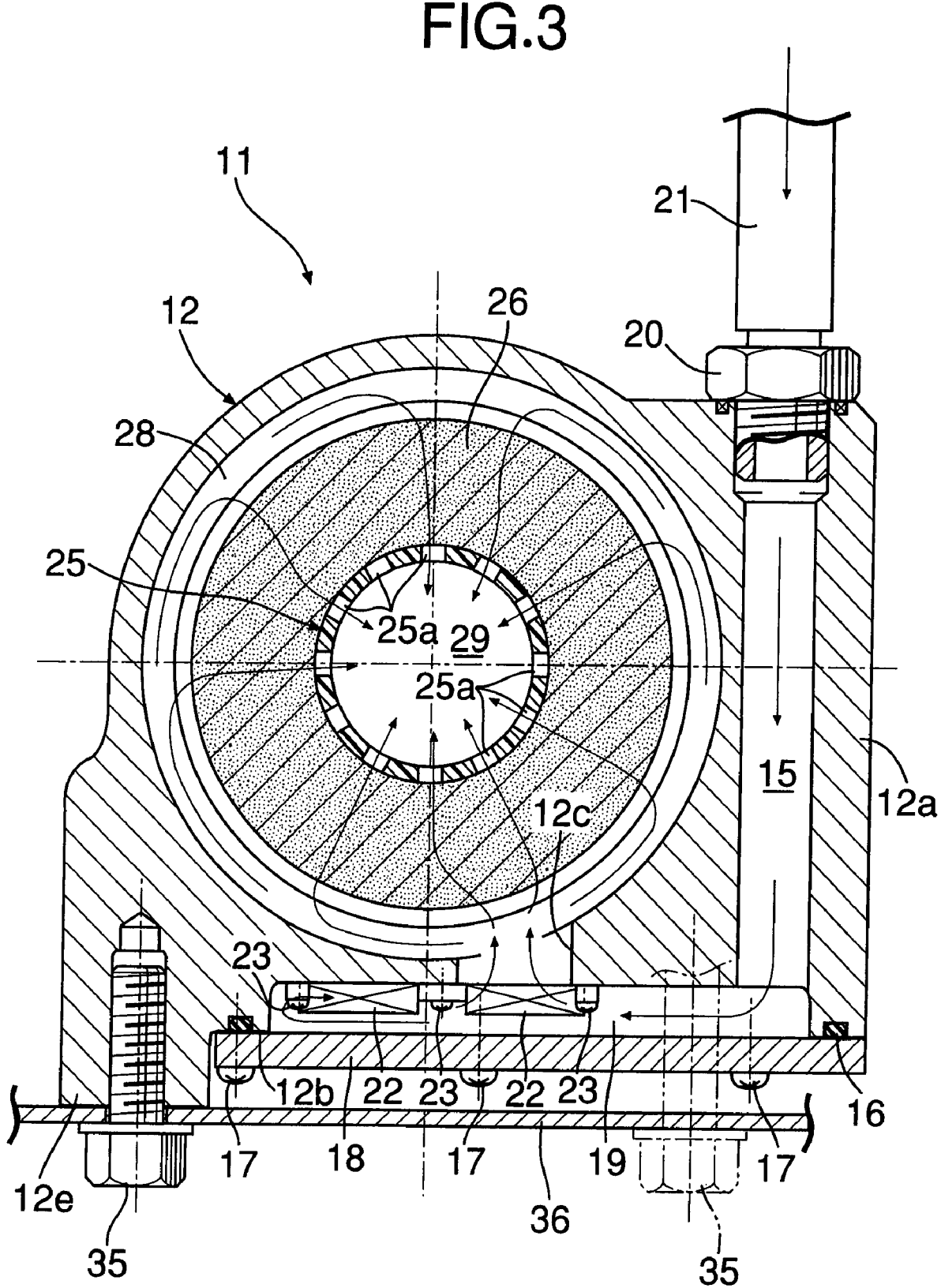
FIG. 3 is a view taken along a line 3-3 in FIG. 2.
Figure 4:
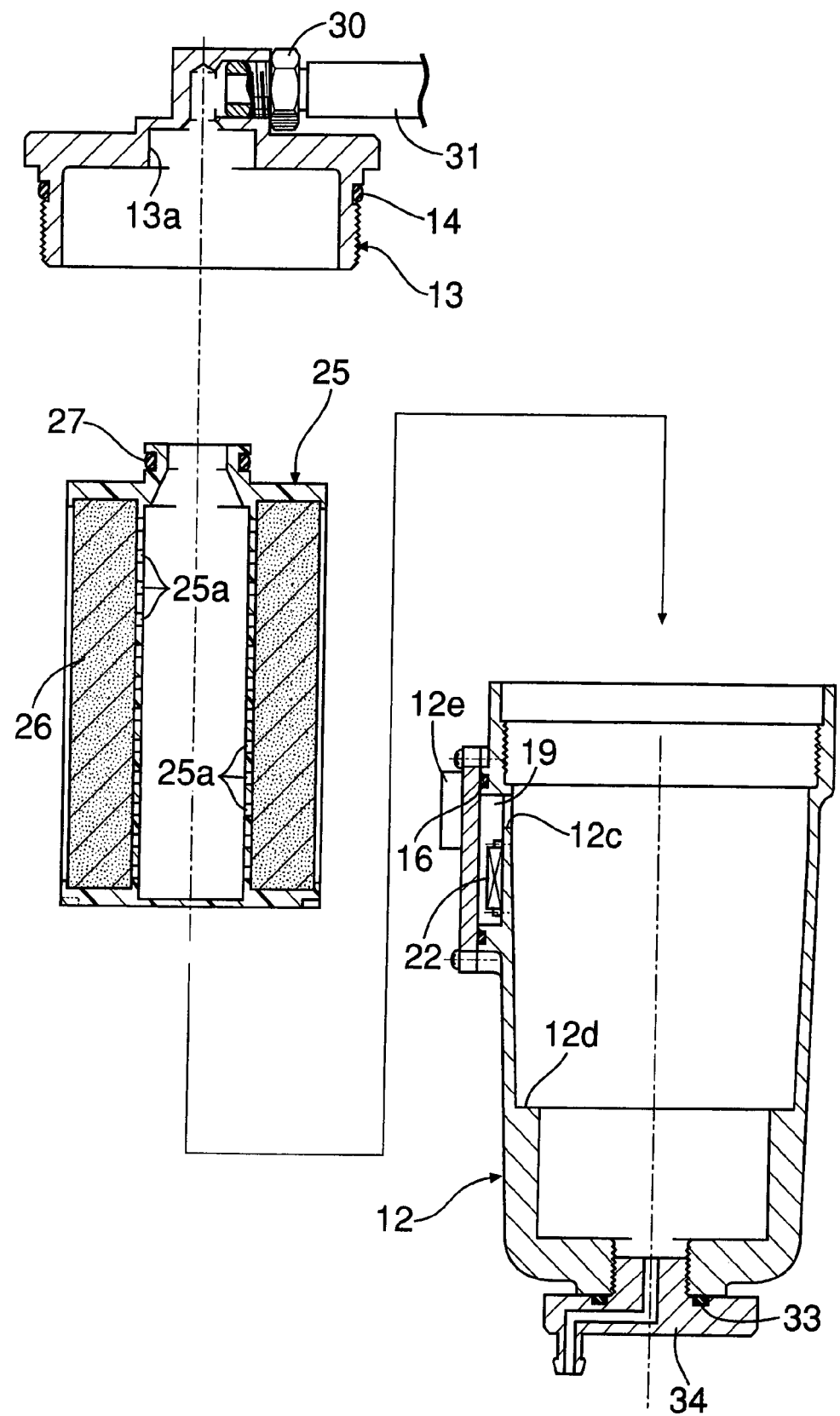
FIG. 4 is an exploded view of the fuel filter for the automobile.
Figure 5:
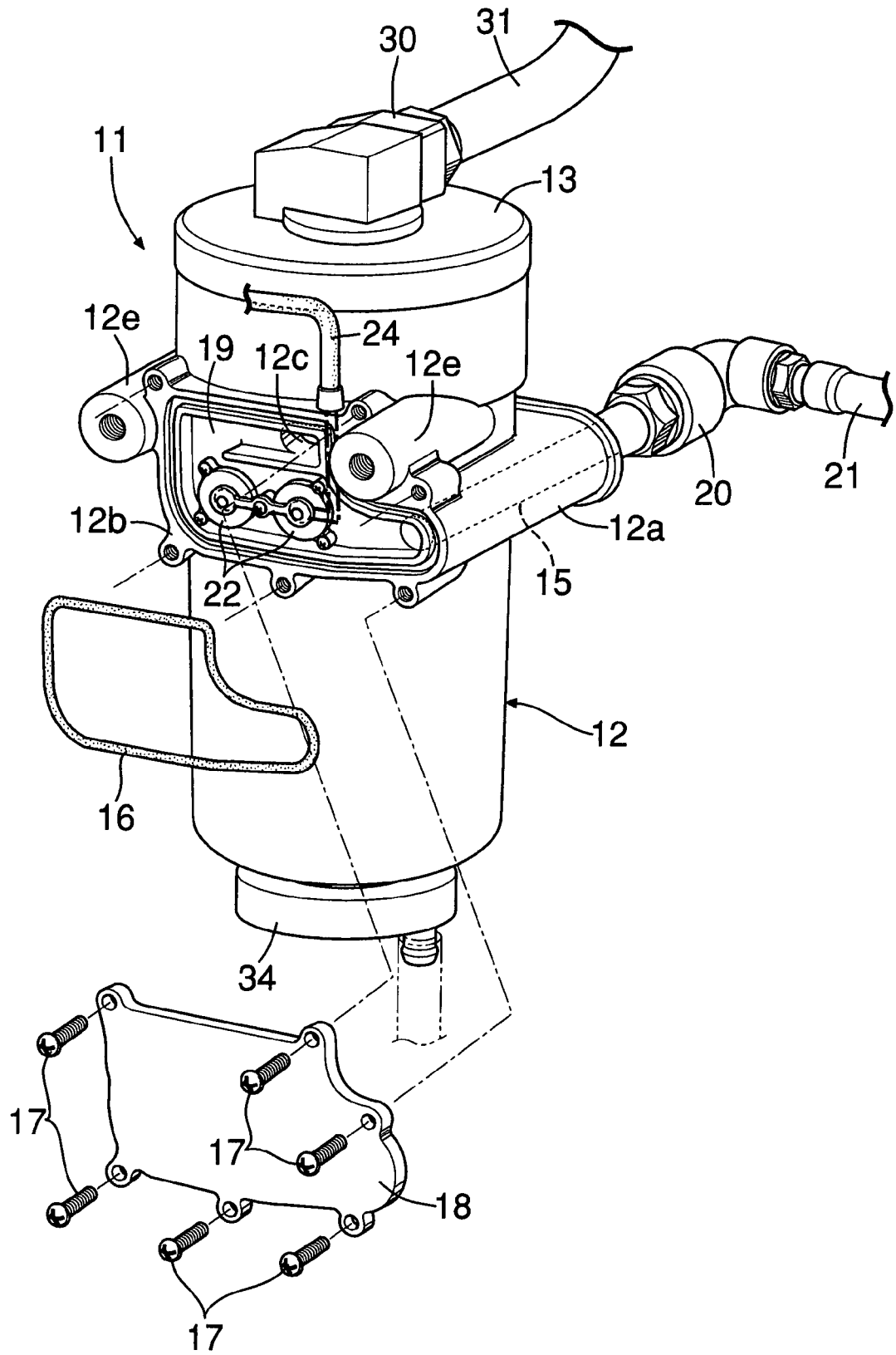
FIG. 5 is a perspective view of the fuel filter for the automobile.

A fuel filter 11 is disposed in a fuel supply path for supplying fuel from a fuel tank to an engine in an automobile. The fuel filter 11 includes a bottomed cylindrical filter case 12 having an open upper surface. A detachable circular cap 13 is threadedly coupled to an opening in the upper surface of the filter case 12 with a seal member 14 interposed therebetween. A bulge 12a projects from a side surface of the filter case 12 at a location close to an upper end of the filter case 12, and extends in a tangential direction therefrom. A first fuel supply passage 15 is formed within the bulge 12a.

A generally J-shaped recessed groove is defined in a flat seat face 12b formed on a side surface that is perpendicular to the bulge 12a of the filter case 12. The groove defines a generally J-shaped second fuel passage 19 between the groove and a cover member 18 that is fixed to the seat face 12b by a plurality of, e.g., six, bolts 17 with a seal member 16 interposed therebetween. The first fuel supply passage 15 is connected at an upstream end to the fuel tank through a joint 20 and fuel pipe 21. The first fuel supply passage 15 communicates at a downstream end with an upstream end of the second fuel supply passage 19 at a right angle. The second fuel supply passage 19 communicates at a downstream end with an interior of the filter case 12 through a communication bore 12c.

Two disk-shaped fuel heaters 22, 22 are fixed by bolts 23 to a bottom of the groove defining the second fuel supply passage 19. Each fuel heater 22, 22 is of a well-known type, which generates heat using an electric resistance, and is connected through a harness 24 to a battery (not shown).

A tubular filter element 26 is mounted around an outer periphery of a bobbin-shaped element holder 25. When the element holder 25 is inserted into the filter case 12 through the opening at the upper end of the filter case 12 until a lower end abuts against a step 12d formed within the filter case 12 and the cap 13 is fastened, e.g., threadably, to the filter case 12, a seal member 27 mounted around an outer periphery of an upper end of the element holder 25 abuts against an inner peripheral surface of a support bore 13a of the cap 13, thereby positioning the element holder 25 and the filter element 26 within the filter case 12.

When the seal member 27 abuts against the inner peripheral surface of the support bore 13a, a gap may be defined in at least one of a first location between the element holder 25 and the step 12d and a second location between the element holder 25 and the cap 13. Setting the dimensions to form the gap will absorb variations in the actual dimensions of the element holder 25.

In this state, a dirty chamber 28 is defined between the inner peripheral surface of the filter case 12 and the outer peripheral surface of the filter element 26, and a clean chamber 29 is defined at the centers of the filter element 26 and the element holder 25. The dirty chamber 28 and the clean chamber 29 communicate with each other, through the filter element 26 and a plurality of openings 25a formed in the element holder 25. The clean chamber 29 is connected at an upper end to the engine through a joint 30 mounted on the cap 13 and through the fuel pipe 31.

A drain chamber 32 is defined in the bottom of the filter case 12 and communicates with the dirty chamber 28. A drain plug 34 is mounted in a bottom wall of the drain chamber 32 with a seal member 33 interposed therebetween.

A pair of boss portions 12e, 12e are projectingly provided on opposing left and right sides of the seat face 12b of the filter case 12. A mounting bracket 36 is fixed to the boss portions 12e, 12e by bolts 35, 35 and mounted in place on the vehicle body.

The operation of the present embodiment having the above-described structural arrangement will be described below.

Fuel from the fuel tank is supplied to the engine through fuel pipe 21, the joint 20, the first fuel supply passage 15, the second fuel supply passage 19, the communication bore 12c, the dirty chamber 28, the filter element 26, the openings 25a in the element holder 25, the clean chamber 29, the joint 30 and the fuel pipe 31. When the fuel flows from the dirty chamber 28 through the filter element 26 and into the clean chamber 29, foreign matter contained in the fuel is filtered out of the fuel by the filter element so that the cleaned or filtered fuel is supplied to the engine. Water contained in the fuel is accumulated in the drain chamber 32 provided in the bottom of the filter case 12 due to a difference in specific gravity between the water and the fuel, and the water is then discharged at an appropriate time.

If a water level sensor is mounted in the bottom of the drain chamber 32, the timing for discharging the accumulated water can thereby be reliably confirmed.

At a lower temperature where there is a possibility that the wax contained in the fuel precipitates, an electric current is supplied to the fuel heaters 22, 22 through the harness 24, so that the fuel is heated, directly or indirectly, by the heat generated by the fuel heaters 22, 22. Specifically, because the fuel heaters 22, 22 are disposed within the second fuel supply passage 19 formed in the filter case 12, and because the filter case 12 is made of a metal having a high heat transfer coefficient, the filter case 12 is efficiently heated. The filter element 26 accommodated in the filter case 12 is also efficiently heated.

The first and second fuel supply passages 15 and 19 are defined directly in the body of the filter case 12 and extend along approximately half of the outer periphery thereof. As such, it is possible to prevent a sudden increase in flow path resistance, to prevent a sudden change in flow rate of the fuel to enable a smooth fuel supply, and to heat the fuel flowing through the fuel supply passages 15 and 19 and contacting the wall surfaces of the passages over a relatively long time.

Especially, because the second fuel supply passage 19 has a J-shape, and therefore provides an increased path length, the fuel contacts the wall surfaces of the passages over a long duration and is efficiently heated. Moreover, because the second fuel supply passage 19 is formed so as to extend along the two fuel heaters 22, 22, the fuel has sufficient contact with the fuel heaters 22, 22 and is efficiently heated.

Thus, the fuel passing through the filter element 26 is heated to a temperature equal to or higher than a temperature where the wax component precipitates. Also, it is possible to avoid a situation where the filter element 26 is clogged with the precipitated wax component that would obstruct the fuel supply. Further, because the fuel heaters 22, 22 are mounted directly on the filter case 12, the filter element 26 extending along the inner peripheral surface of the filter case 12 is efficiently heated, thereby further reliably preventing the filter element 26 from becoming clogged by the wax component.

Because the fuel is effectively heated by the fuel heaters 22, 22 as described above, relatively small sized fuel heaters 22, 22 are used, thereby reducing the overall size of the fuel filter 11.

Although an embodiment of the present invention has been described in detail, the present invention is not limited to the above-described embodiment, and various modifications in design can be made within the scope of the invention.

For example, in the embodiment, the filter case 12 is mounted to the vehicle body through the mounting bracket 36, but the mounting bracket 36 may be of any shape, and the filter case 12 may be mounted directly on the vehicle body without using the mounting bracket 36.

Also, while the engine described above is preferably a diesel engine, the present invention is not limited to use with such an engine and can be used with any other known or later developed fuel-operated engine.

In the embodiment, the filter case 12 includes the two boss portions 12e, 12e, but the number of the boss portions 12e may be three or more.

In addition, the first fuel supply passage 15 and the second fuel supply passage 19 need not necessarily be perpendicular to each other and may be smoothly connected to each other by an arc of a circle substantially concentric with a circle drawn by the inner periphery of the filter case 12. In this case, the flow path resistance can be further decreased.

What is claimed is:

1. A fuel filter for an automobile, comprising:
   a filter element for filtering fuel;
   a tubular filter case having a bottom surface and a side surface and which accommodates the filter element therein;
   a fuel heater; and
   a fuel supply passage for supplying the fuel to the filter element, the fuel supply passage being formed along the side surface of the filter case by a recessed groove defined in the side surface of the filter case,
   wherein the fuel heater is arranged inside the fuel supply passage.

2. The fuel filter according to claim 1, wherein the filter case includes a plurality of boss portions attached to an external member, and wherein the heater is disposed between the plurality of boss portions.

3. The fuel filter according to claim 1, wherein the fuel supply passage is substantially J-shaped.

* * * * *